United States Patent [19]

Ishizuka et al.

[11] Patent Number: 5,198,873
[45] Date of Patent: Mar. 30, 1993

[54] ENCODER UTILIZING INTERFERENCE USING MULTI-MODE SEMICONDUCTOR LASER

[75] Inventors: Ko Ishizuka, Urawa; Tetsuharu Nishimura, Kawasaki; Yoichi Kubota, Yokohama; Masaaki Tsukiji; Satoshi Ishii, both of Tokyo, all of Japan

[73] Assignee: Canon Kabushiki Kaisha, Tokyo, Japan

[21] Appl. No.: 789,633

[22] Filed: Nov. 12, 1991

Related U.S. Application Data

[63] Continuation of Ser. No. 423,350, Oct. 18, 1989, abandoned.

[30] Foreign Application Priority Data

Oct. 19, 1988 [JP] Japan ................................. 63-264687

[51] Int. Cl.$^5$ ............................................. G01B 9/02
[52] U.S. Cl. .................... 356/356; 250/231.16; 250/237 G
[58] Field of Search ................ 356/355, 363, 400, 401, 356/356; 250/237 G, 231.16

[56] References Cited

U.S. PATENT DOCUMENTS

| | | | |
|---|---|---|---|
| 4,629,886 | 12/1986 | Akiyama et al. | 250/237 G |
| 4,676,645 | 6/1987 | Taniguchi et al. | 356/356 |
| 4,829,342 | 5/1989 | Nishimura | 356/356 |
| 4,868,385 | 9/1989 | Nishimura | 250/231 SE |

FOREIGN PATENT DOCUMENTS

| | | |
|---|---|---|
| 65429 | 11/1982 | European Pat. Off. |
| 146244 | 6/1985 | European Pat. Off. |
| 1364563 | 8/1974 | United Kingdom |
| 2187282 | 9/1987 | United Kingdom |

OTHER PUBLICATIONS

Optics Letters, vol. 13, No. 8, published Aug., 1988, pp. 628-630, by Wei-Kuo Chen and Pao-Lo Liu.

*Primary Examiner*—Samuel A. Turner
*Attorney, Agent, or Firm*—Fitzpatrick, Cella, Harper & Scinto

[57] ABSTRACT

An interferometer for measuring the displacement of a diffraction grating includes a multi-mode semiconductor laser for generating a laser beam; a device for supplying a predetermined current to the laser so that at least five vertical modes occur in an oscillation spectrum of the laser beam generated by the laser at an intensity ratio of at least 0.05; and an optical system for splitting the laser beam generated by the laser into first and second beams. The optical system also directs the first and second beams to the diffraction grating and effects interference between a first diffracted light beam generated by the diffraction of the first beam at the diffraction grating and a second diffracted light beam generated by the diffraction of the second beam at the diffraction grating to produce an interference light beam. Also provided is a photoelectric convertor for converting the interference light beam into an electrical signal.

17 Claims, 11 Drawing Sheets

FIG. 10(a)
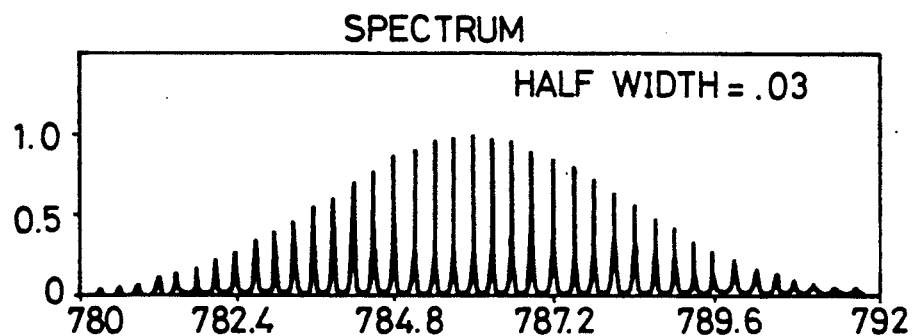
FIG. 10(b)  FIG. 10(c)
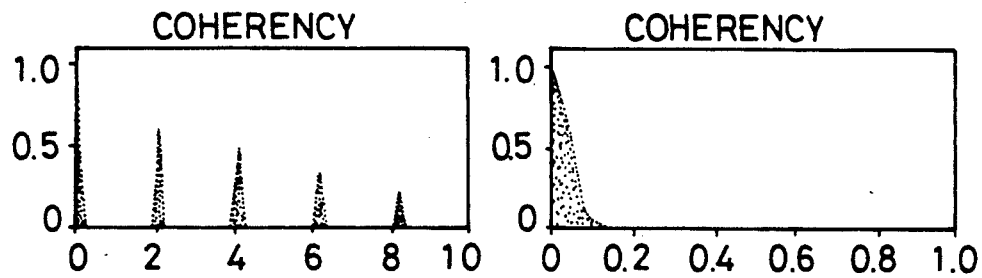
FIG. 11(a)
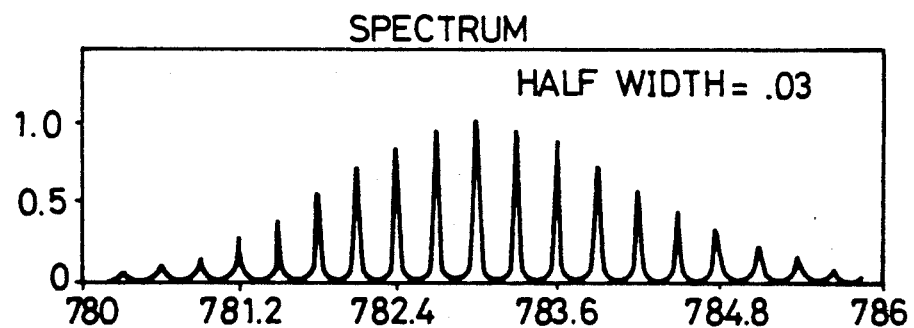
FIG. 11(b)  FIG. 11(c)
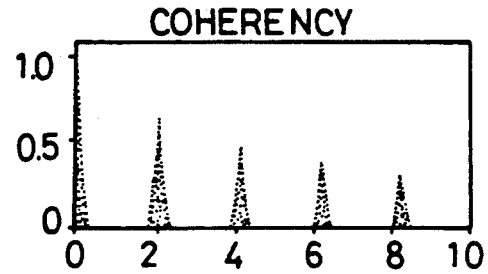 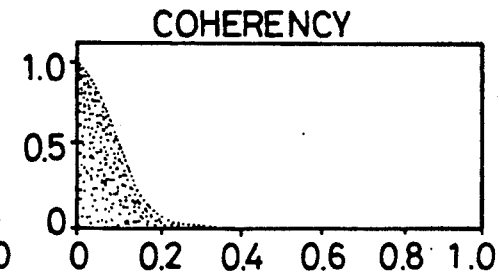

SPECTRUM

COHERENCY

COHERENCY

SPECTRUM

COHERENCY

COHERENCY

FIG. 16(a)
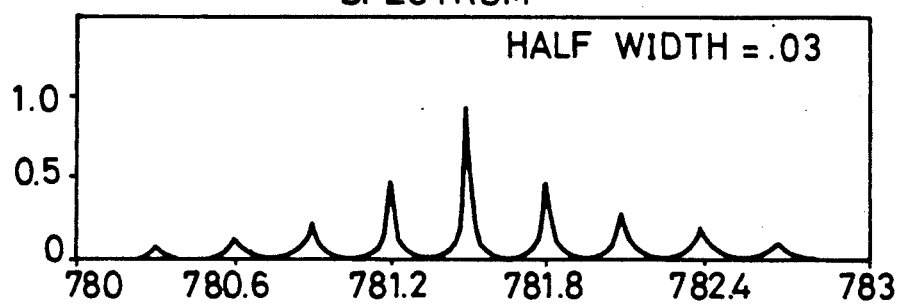
FIG. 16(b)
FIG. 16(c)
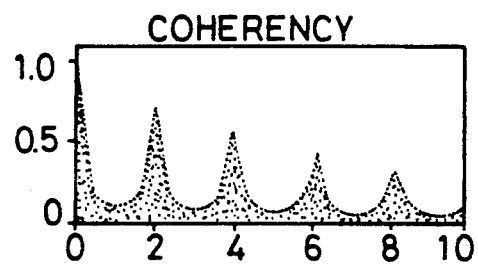
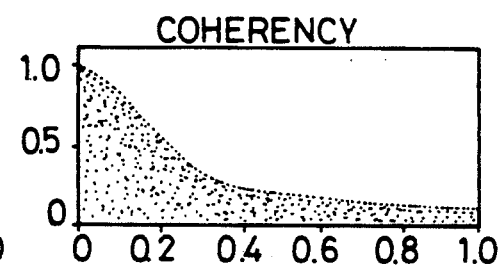
FIG. 17(a)
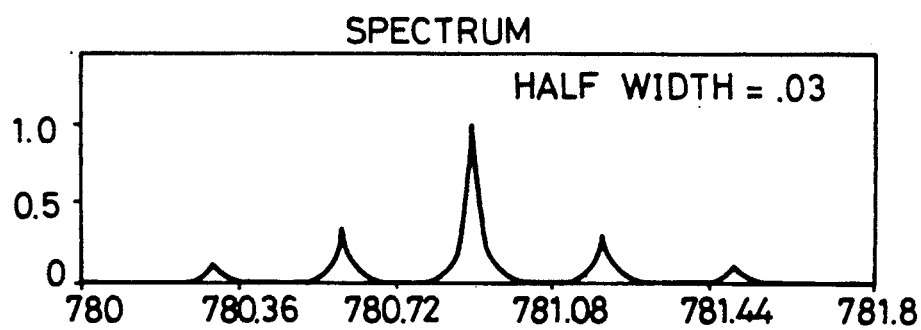
FIG. 17(b)
FIG. 17(c)
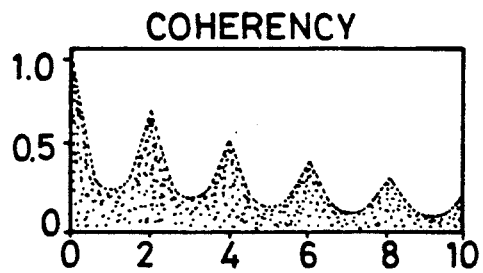
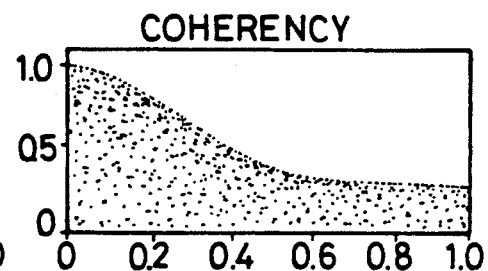

ENCODER UTILIZING INTERFERENCE USING MULTI-MODE SEMICONDUCTOR LASER

This application is a continuation of application Ser. No. 07/423,350, filed Oct. 18, 1989, now abandoned.

BACKGROUND OF THE INVENTION

1. Field of the Invention

This invention relates to an interferometer having a multi-mode semiconductor laser used as a light source and, more particularly, to an interferometer which irradiates a moving diffraction grating with laser light, forms interference light from diffracted light emerging from the diffraction grating and measures the interference light.

2. Description of the Prior Art

A type of encoder is well known which detects the displacement of a scale by superposing diffracted lights emerging from a diffraction grating formed on the scale to form interference light and converting the same into an electrical signal. The periodic signal obtained by this type of encoder has improved resolution compared with encoders using the ordinary combination of a main scale and an index scale. However, to use interference light for detection of displacement, the conditions for the occurrence of the interference of light must be established. In general, if the difference between the optical paths of two light beams to be made to interfere with each other (the difference between the times taken to reach the interfering position from the light source) is zero, the intensity of the interference signal is maximized irrespective of the type of light source. However, as the width of the spectrum of the light source (spectral width) becomes wider, the intensity of interference light decreases abruptly due to the slight difference between the optical paths of the two light beams. Lasers which emit light of very small spectral widths have, therefore, been used as light sources for interferometers, including the above-mentioned type of encoder, utilizing interference light. Specifically, semiconductor lasers have many advantages, for example, that of being reduced in size and requiring a reduced driving current, and they therefore contribute to reductions in the overall size and the production cost of interferometers if they are incorporated therein as light sources.

However, the following problems are encountered when semiconductor lasers are used as light sources for interferometers.

Semiconductor lasers include a single mode laser having one oscillation spectrum mode and a multi-mode laser having a plurality of oscillation spectrum modes. A single mode laser has improved interference performance (has a larger coherence length) but changes discontinuously with changes in operating temperature and driving current so that the phase of the interference signal changes discontinuously, resulting in errors in detecting changes in the intensity of interference light by counting periodic signals corresponding to these changes. For prevention of this phenomenon, it is necessary to add a system for accurately controlling the operating temperature and the driving current. The provision of such means necessarily makes the interferometer larger, more complicated and more expensive.

On the other hand, multi-mode lasers ordinarily have shorter coherence lengths and various oscillation spectra. Their interference performance is therefore unstable. For this reason, they cannot be easily utilized in interferometers.

SUMMARY OF THE INVENTION

In view of these problems, an object of the present invention is to provide an interferometer capable of measuring interference with improved stability by using a multi-mode laser.

To this end, the present invention provides in one of its aspects an interferometer employing, as a light source, a multi-mode laser having at least five vertical modes with an intensity ratio of 0.05 or higher. The intensity ratio is defined as the ratio of the intensity of the oscillation spectrum (wavelength spectrum) of the laser to the peak value of the oscillation spectrum of the laser when the peak value of the oscillation spectrum of the semiconductor laser is 1. The width of the oscillation spectrum (all modes or a predetermined mode) at an intensity ratio of 0.5 is called the half width.

The present invention provides in another of its aspects an interferometer in which the laser beam emitted from a multi-mode laser is directed to a diffraction grating. An interference beam is formed from the diffracted beam generated at the diffraction grating, and is converted into an electrical signal, thereby measuring the displacement of the diffraction grating. In this interferometer, the number of vertical modes of the laser at an intensity ratio of 0.05 or higher is set to five or more.

In a preferred form of the present invention, the semiconductor laser is adjusted so as to satisfy the following two conditions in addition to the above conditions:

(A) the width of an envelop at an intensity ratio of 0.05 or higher which connects peaks of respective vertical modes in the oscillation spectrum is 6 nm or less; and (B) the half width of each of the at least five vertical modes is set to 0.03 nm or more.

In accordance with the present invention, a multi-mode semiconductor laser is used, as the laser, in a suitable manner to ensure that the amplitude of the interference signal (contrast) is stable during assembly or measurement, and that even if the optical path difference is changed by thermal expansions of the frame of the interferometer due to changes in the environmental temperature, the reduction in the amplitude of the interference signal is small and the occurrence of a discontinuity in the signal phase can be avoided.

According to one aspect, the present invention relates to an interferometer comprising a multi-mode semiconductor laser generating a laser beam having at least five vertical modes having an intensity ratio of at least 0.05, generation means for generating an interference light beam from a laser beam supplied from the laser, and detection means for detecting the interference light beam. The laser is constructed to generate a laser beam having an envelop that envelopes peaks of the respective vertical modes of the oscillation spectrum of the laser beam, such that the envelops has a width of no greater than 6 nm. The laser is also constructed so as to generate a laser beam such that the width of each of the at least five vertical modes is at least 0.03 nm, and has a coherency length of at least 100 μm. The generation means can include an optical system for splitting the laser beam into first and second beams and superposing the first and second beams. The detection means can include a photodetector capable of converting the interference light into electricity to generate a predetermined signal. The interferometer can also include means for supplying a driving current to the laser, the driving current determining the number of vertical modes.

According to another aspect, the present invention relates to method of measuring interference light comprising the steps of supplying laser radiation with a predetermined spectrum having at least five vertical modes with an intensity ratio of at least 0.05, forming an interference beam with the laser radiation, and detecting the interference beam.

According to still another aspect, the present invention relates to an apparatus for measuring the displacement of a diffraction grating. The apparatus comprises a multi-mode semiconductor laser generating a laser beam having at least five vertical modes with an intensity ratio of at least 0.05; interference means for directing the laser beam from the laser to the diffraction grating and causing first and second diffracted light beams generated at the diffraction grating to interfere with each other to generate an interference light beam; and conversion means for converting the interference light beam supplied by the interference means into an electrical signal. The interference means is arranged to cause the optical path lengths of the first and second diffracted light beams to be substantially equal to each other. In this, respect, the laser is also constructed to generate a laser beam having an envelop, half width, and coherence length that satisfy the values noted above.

According to yet another aspect, the present invention relates to an apparatus for measuring the displacement of a diffraction grating that comprises a multi-mode semiconductor laser for generating laser beam; supply means for supplying a predetermined current to the laser so that at least five vertical modes occur in an oscillation spectrum of the laser beam generated by the laser at an intensity ratio of at least 0.05; interference means for splitting the laser beam generated by the laser into first and second beams, for directing the first and second beams to the diffraction grating, and for effecting interference between a first diffracted light beam generated by diffraction of the first beam at the diffraction grating and a second diffracted light beam generated by diffraction of the second beam at the diffraction grating to produce an interference light beam; and conversion means for converting the interference light beam supplied by the interference means into an electrical signal. In this aspect the laser is also constructed to generate a laser beam having an envelop, half width, and coherence length with the values noted above. In addition, the interference means is arranged to cause the optical path length of the first and second diffracted light beams to be substantially equal to each other.

According to still another aspect, the present invention relates to a method for measuring the displacement of a diffraction grating and comprises the steps of directing laser radiation with a predetermined spectrum having at least five vertical modes each having an intensity ratio of at least 0.05 to the diffraction grating; forming an interference beam from the diffraction beams generated at the diffraction grating; and converting the interference beam into an electrical signal. In this respect, the forming step includes a step of superposing $\pm 1$-order diffraction beams generated by the diffraction grating to form the interference beam, the optical path lengths of the $\pm 1$-order beam being substantially equal. The directing step specifically comprises the step of directing to the diffraction grating laser radiation having an envelop which envelopes peaks of respective vertical modes of the oscillation spectrum, with the width of the envelop being no more than 6 nm and with the half width of each of the at least five vertical modes being at least 0.03 nm. In addition, the directing step can include the steps of providing a multi-mode semiconductor laser and supplying a predetermined current to the laser so to emit the laser radiation from the laser.

BRIEF DESCRIPTION OF THE DRAWING

FIGS. 10(a) to 17(c) are graphs of the state of the coherency function when the width of the envelop over the oscillation spectrum of the semiconductor laser is changed; and FIGS. 18(a) to 20(c) are graphs of the state of the coherency function when the shape of the envelop over the oscillation spectrum of the semiconductor laser is changed.

DESCRIPTION OF THE PREFERRED EMBODIMENT

Figure 1:
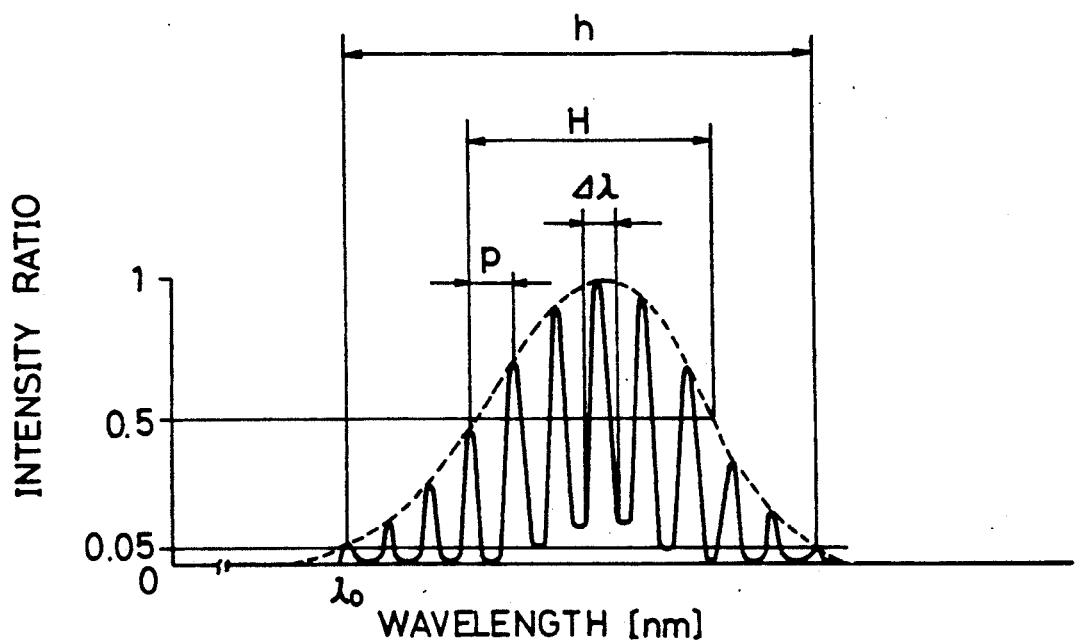
FIG. 1A is a graph of an oscillation spectrum of a multi-mode semiconductor laser used in an embodiment of the present invention.
FIG. 1B is a schematic diagram of an interferometer which incorporates a semiconductor laser having the oscillation spectrum shown in FIG. 1A.
Figure 1:
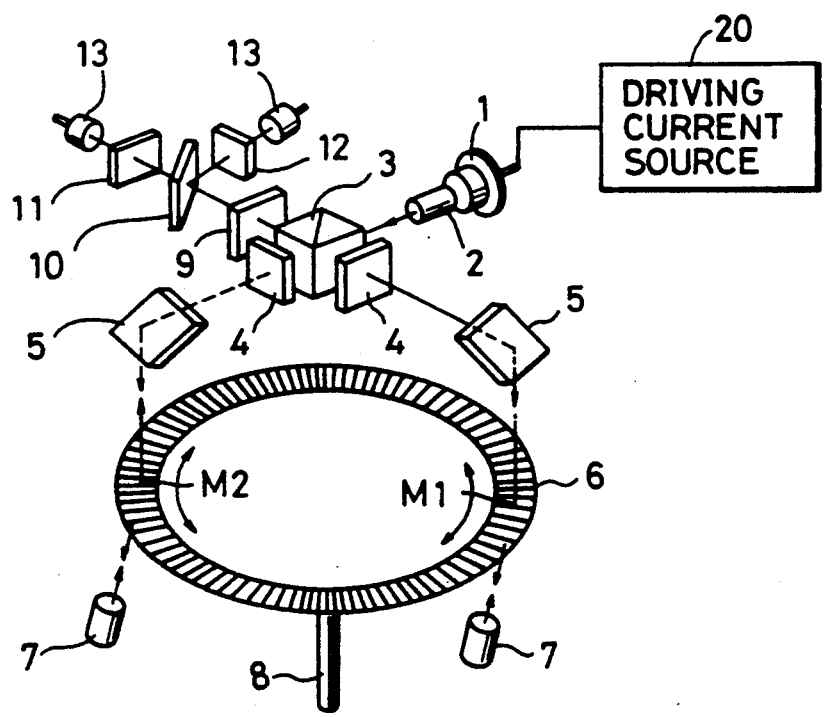

FIGS. 1A and 1B illustrate features of an embodiment of the present invention; FIG. 1A is a graph of an oscillation spectrum of a multi-mode semiconductor laser 1 used in this embodiment; and FIG. 1B shows a rotary encoder for detecting a displacement, i.e., for detecting the angular change of the scale of a diffraction grating formed on a rotary scale.

Referring to FIG. 1B, the multi-mode semiconductor laser 1 outputs a laser light beam in accordance with the oscillation spectrum of FIG. 1A by receiving a driving signal supplied from a driving current source 20. A collimator lens 2 converts the laser light beam output from the semiconductor laser 1 into a parallel light beam and directs the same toward a polarizing prism 3. The polarizing prism 3 splits the laser light beam into two beams, one of P-polarized light and one of S-polarized light which pass through $\frac{1}{4}$ wave plates 4 and turn-back mirrors 5 so as to be incident upon a diffraction grating on a rotary scale 6 at positions $M_1$ and $M_2$. Transmission-diffracted light beams diffracted at the positions $M_1$ and $M_2$ ($\pm 1$-order diffraction lights) are reflected by reflection optical systems 7, are directed toward the positions $M_1$ and $M_2$ again and are diffracted at these positions again. The rediffracted light beams diffracted at the position $M_1$ or $M_2$ again are returned to the polarizing prism 3 via the turnback mirrors 5 and the $\frac{1}{4}$ wave plates and are superposed on each other by the polarizing prism 3. The superposed beam is changed into beams of circular polarized light of opposite rotations by a $\frac{1}{4}$ wave plate 9 and is split into two beams by a beam splitter 10. Each of these split beams is directed toward one of two photodetectors 13 through a polarizing plate 11 or 12. The polarizing plates 11 and 12 are disposed so that the polarizing directions of the two beams are shifted by 90° from each other, thereby enabling the two photodetectors 13 to receive beams of light having phases shifted by 90° from each other. Interference fringes (monochromatic) are formed on the light receiving surface of each photodetector 13 as a result of interference between the two beams of diffracted light. The brightness of the interference fringes is changed as the rotary scale 6 rotates about a rotary shaft 8. It is therefore possible to measure the state of rotation of the rotary scale 6, i.e., the displacement of the diffraction grating, by detecting a photoelectric conversion signal obtained from each photodetector 13.

If, as shown in FIG. 1A, the number of vertical modes having an intensity ratio equal to or higher than 0.05 is denoted by N; the half width of each vertical mode is denoted by $\Delta\lambda$ [nm]; the half width of the envelop of the range of intensity ratio of the oscillation spectrum equal to or higher than 0.05 is denoted by h [nm]; a representative oscillation wavelength is denoted by $\lambda_0$ [nm], and the distance between the vertical modes is denoted by P [nm], then the semiconductor laser of this embodiment satisfies the following equations:

$$N \geq 5 \qquad (1)$$

$$h \leq 6 \text{ nm} \qquad (2)$$

$$\Delta\lambda \geq 0.03 \text{ nm} \qquad (3)$$

If the number of oscillation modes becomes smaller and if N is 4 or less, one or two vertical modes are dominant for interference, and a representative $\lambda_0$ oscillation wavelength therefore changes discretely (a mode whip takes place) as the temperature of the environment of the laser changes. As a consequence, the laser can be stabilized against changes in environmental temperature by setting $N \geq 5$ as represented in equation (1).

In a case where a light source having a limited coherence length such as a multi-mode semiconductor laser is used for the interferometer, it is necessary to limit variations in the difference between the optical path lengths of the two beams including those due to thermal expansion of the frame of the interferometer to the range of the coherence length. Unless the variations are limited to this range, there is a possibility of failure to obtain any interference signal (corresponding to changes of brightness of the interference light). In the case of an interferometer such as the encoder shown in FIG. 1B in which the phase of diffracted light is modulated in accordance with displacements of the diffraction grating, there is no need to change the difference between the optical path lengths of the two beams. This type of interferometer is therefore constructed in such a manner that the difference between the optical path lengths of the two beams is set close to zero at the time of assembly so as to be limited to the range of the coherence length of the light source even if it is changed by thermal expansion of the frame of the interferometer.

To adjust the difference between the optical path lengths, the positions of the optical elements including the mirrors 5 and the optical systems 7 may be adjusted. To equalize the optical path lengths of the two beams in an error range of $\pm 10$ $\mu$m, the positions of the optical elements may be adjusted by using a screw feed mechanism (not shown) or the like. The optical path lengths can be easily adjusted in this manner. Consequently, if the coherence length of the light source is sufficiently large with respect to the range of errors in positioning the mirrors and so on, and is not less than 100 $\mu$m, the illustrated type of interferometer can be adjusted at the time of assembly and measurement so that the degree of interference (visibility or contrast of interference fringes) is optimized.

If the coherence length of the light source can be determined with numerical values, the spectral band width can be approximated by calculation using a Fourier transformation. However, it is necessary that a function of the degree of interference and the optical path difference (i.e., the coherency function) are previously known. Because the coherency functions of semiconductor lasers cannot be generalized, we obtained a coherency function by simulation from a spectral function which can be generalized with several parameters, obtained the range of the spectral function satisfying a coherence length of 100 $\mu$m or more (a conditional equation of parameters expressing the spectral function), and selected a multi-mode semiconductor laser suitable for use in the desired type of interferometer.

Figure 2A:
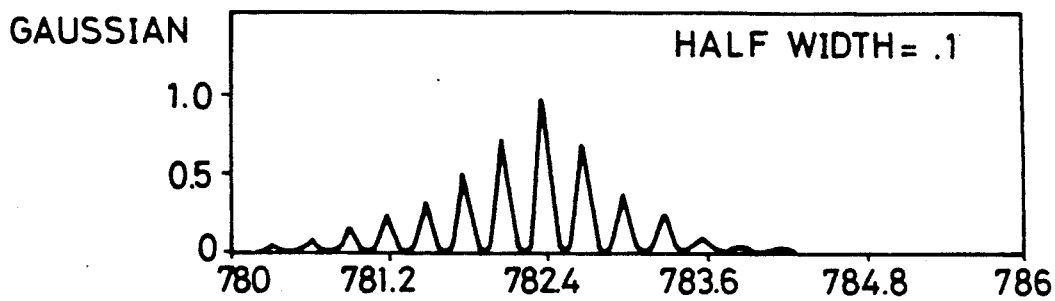
FIGS. 2(a) to 9(c) are graphs of the state of the coherency function when the half width and the spectral function are changed with respect to each oscillation mode of the semiconductor laser.
Figure 2B:
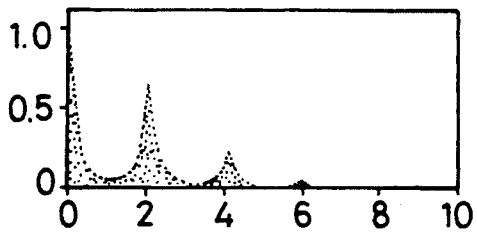
Figure 2C:
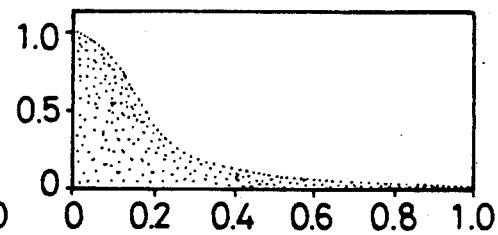
Figure 3A:
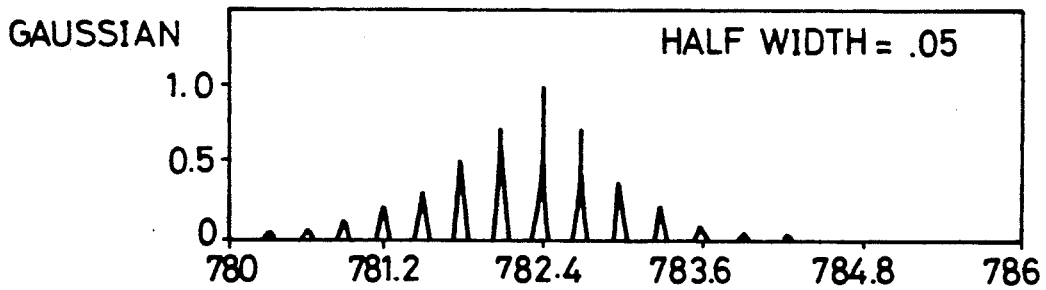
Figure 3B:
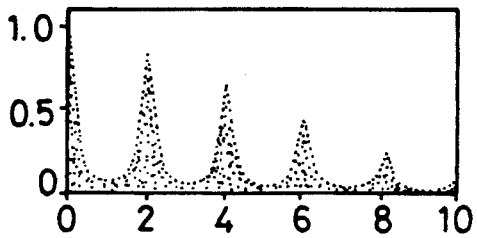
Figure 3C:
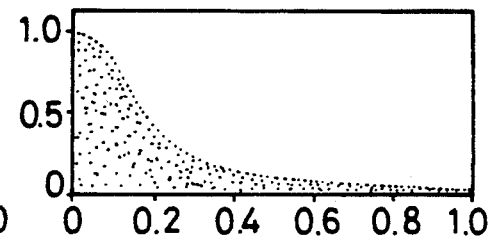
Figure 4:
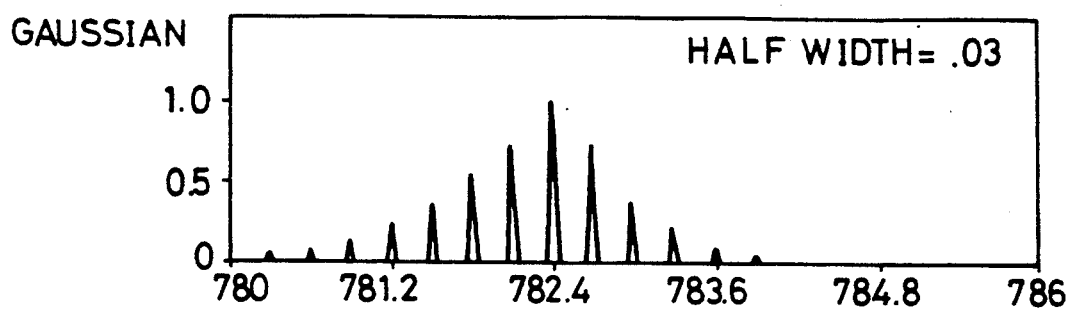
Figure 4:
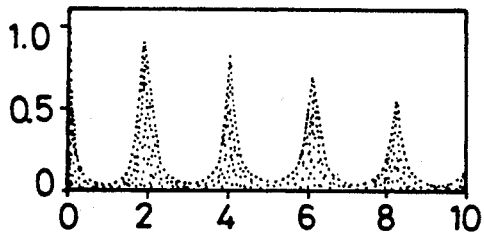
Figure 4:
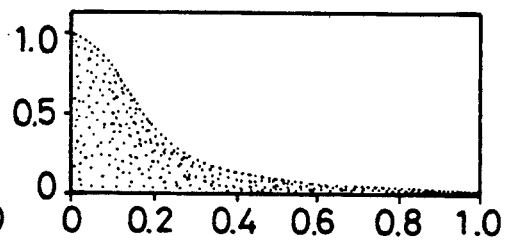
Figure 5:
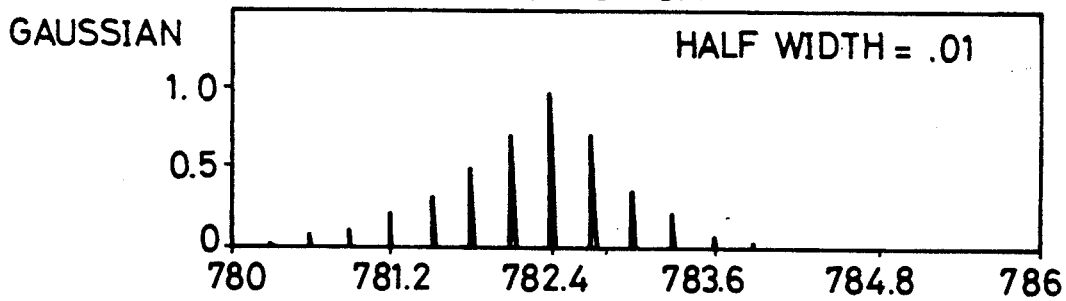
Figure 5:
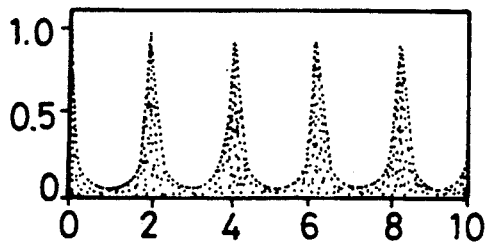
Figure 5:
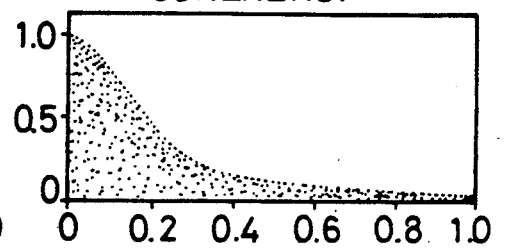
Figure 6A:
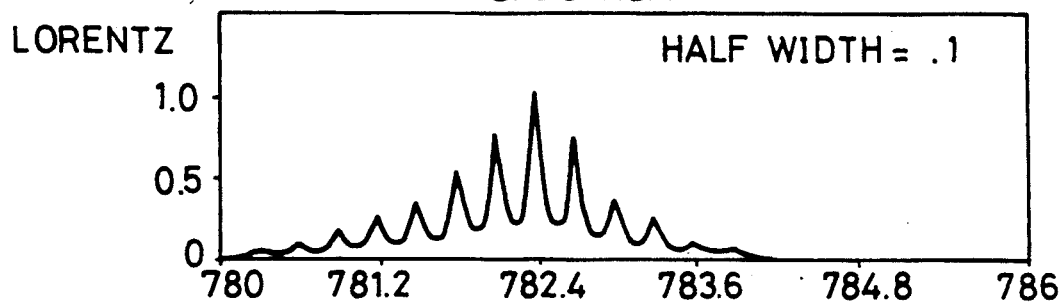
Figure 6B:
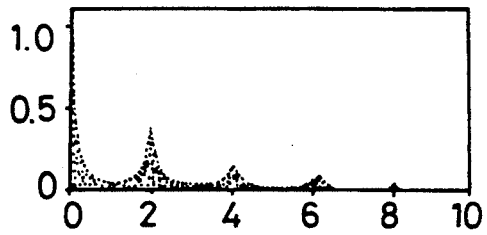
Figure 6C:
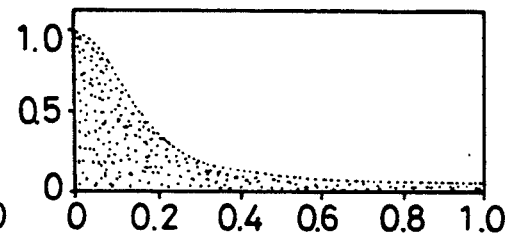
Figure 7A:
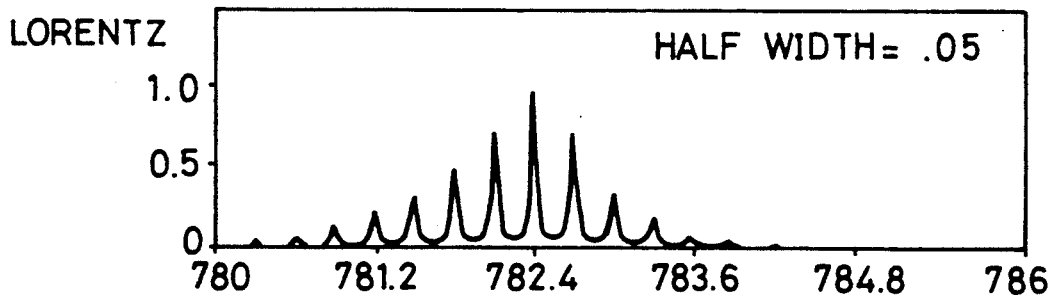
Figure 7B:
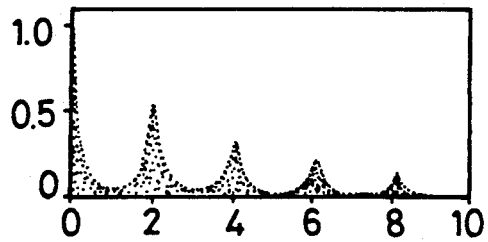
Figure 7C:
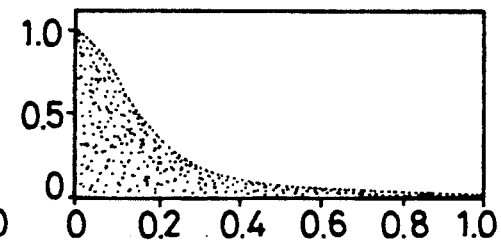
Figure 8A:
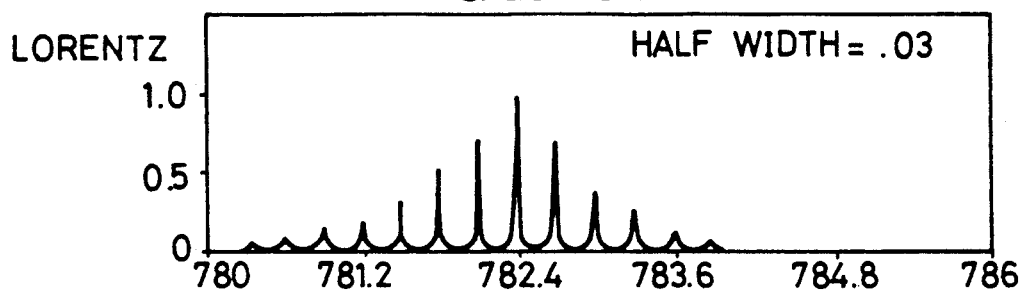
Figures 8B, 8C:
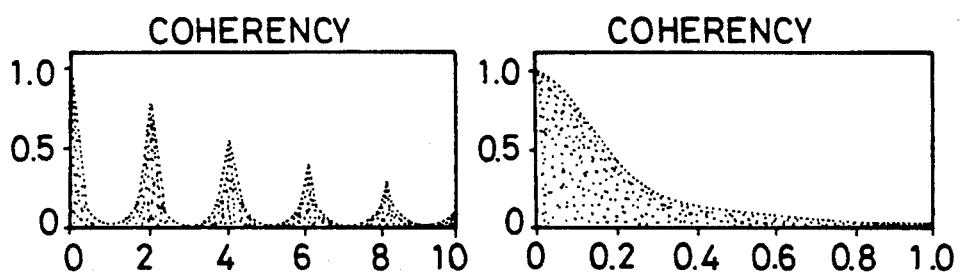
Figure 9A:
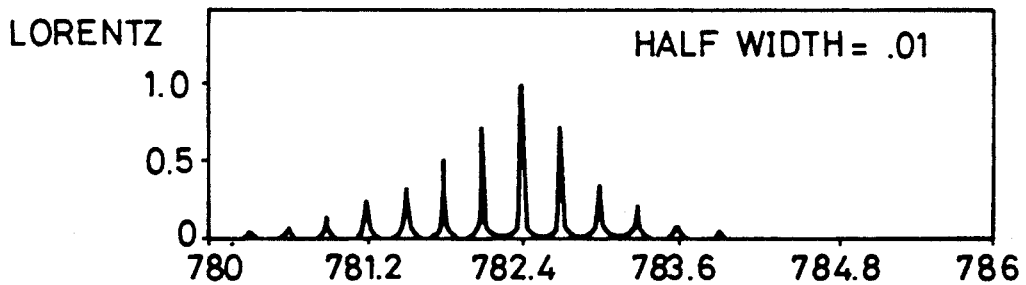
Figures 9B, 9C:
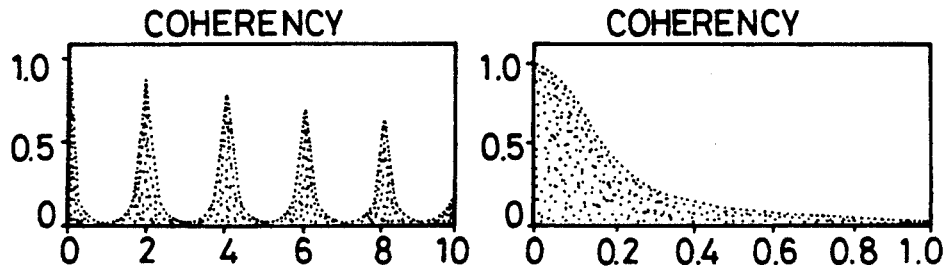
Figure 12A:
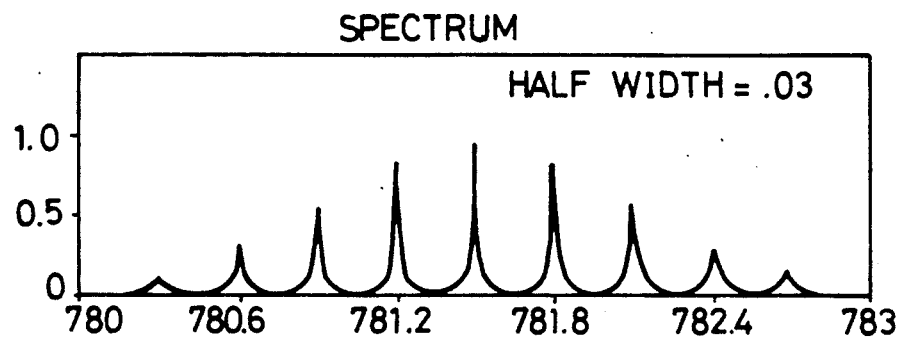
Figure 12B:
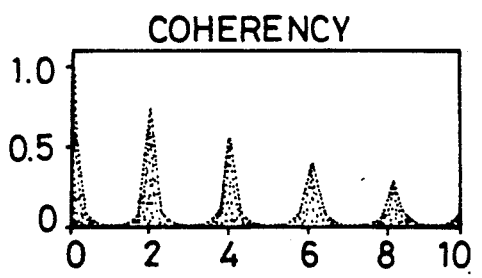
Figure 12C:
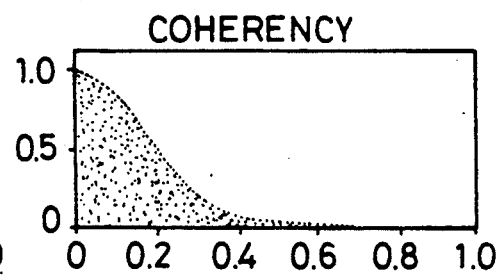

FIGS. 2(a) to 2(c) to FIG. 9(a) to 9(c) are graphs of simulation in which variations in the coherency function of a multi-mode laser having a reference wavelength of $\lambda_0 = 780$ nm and a mode interval of $P = 0.3$ nm were obtained when parameters $\Delta\lambda$, H and h were changed. All the results shown in the graphs were obtained by a Fourier transformation of the spectral function. In FIGS. 2(a) to 2(c) and all subsequent figures, figures denoted (a) illustrate the spectral function, figures denoted (b) illustrate the coherency function, and figures denoted (c) illustrate enlargement of the coherency function of corresponding figures denoted (b) in the vicinity of zero. The unit of measure of the abscissa of figures denoted (a) is [nm], and the unit of the abscissa of figures denoted (b) and (c) is [mm]. The abscissas of (b) and (c) represent optical path differences, and the ordinates of (b) and (c) represent coherency.

Referring to FIGS. 2(a) to 2(c), to 5(a) to 5(c), the coherency function was obtained by assuming a Gaussian type of spectral function of respective modes and changing the half width $\Delta\lambda$ within a range of 0.1 to 0.01 nm. Referring to FIGS. 6(a) to 6(c), to 9(a) to 9(c), the coherency function was obtained by assuming a Lorentz type of spectral function of respective modes and changing the half width $\Delta\lambda$ within a range of 0.1 to 0.01 nm. As is apparent from these graphs, there are a plurality of peaks in the coherency function of the multi-mode semiconductor laser having a plurality of discrete oscillation modes (vertical modes). The smaller the half width $\Delta\lambda$ of each mode, the larger the number of peaks. If the environmental temperature changes during use of an encoder utilizing interference of diffracted light beams, the reference wavelength $\lambda_0$ changes. Changes in the phase of the interference signal and, hence, measurement errors due to changes in the reference wavelength can be reduced if the difference between the optical path lengths of the two beams is very small or '0'.

If the interferometer is adjusted in such a manner that the interference intensity is maximized when the optical path lengths of the two beams are not equal to each other, measurement errors are increased, because a plurality of peaks appear in the coherency function. As a consequence, by using a multi-mode semiconductor laser having vertical modes with a predetermined half width $\Delta\lambda$, it is possible to limit high-order peaks and eliminate obscurity in adjustment for equalizing the optical path lengths. The condition therefor can be expressed as $\Delta\lambda \geq 0.03$ nm as represented by equation (3).

Figure 13A:
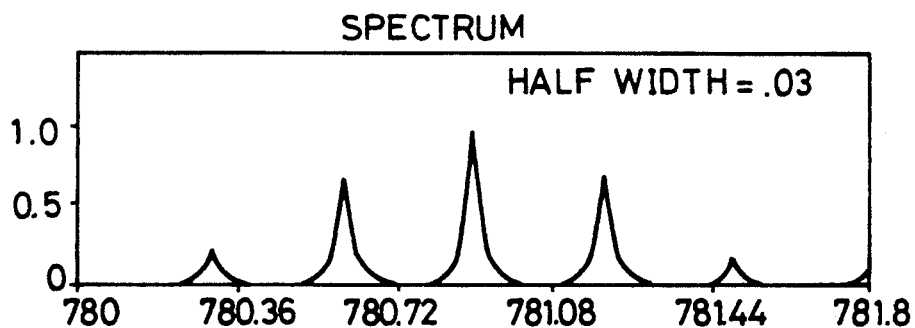
Figure 13B:
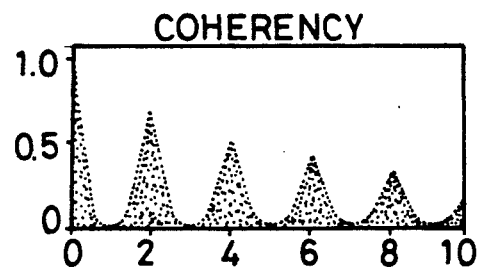
Figure 13C:
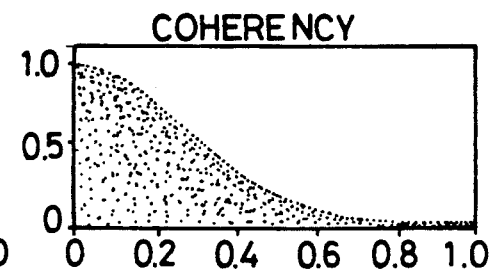
Figure 14:
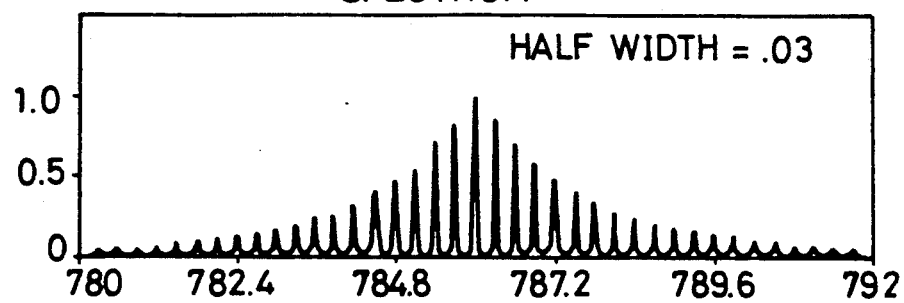
Figure 14:
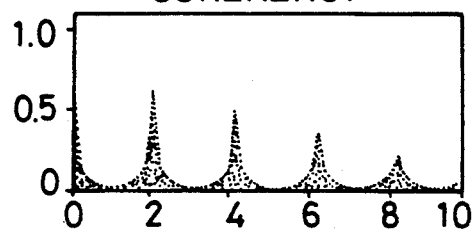
Figure 14:
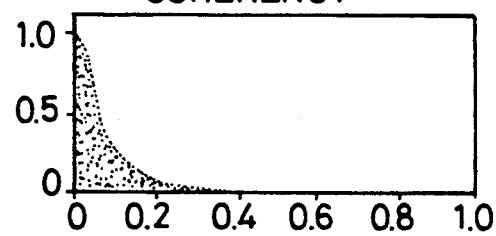
Figure 15:
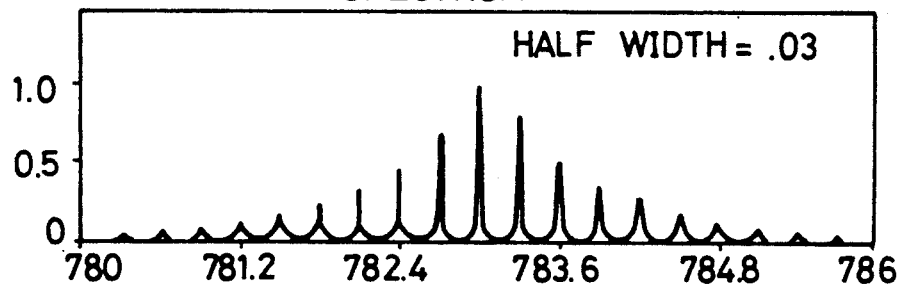
Figure 15:
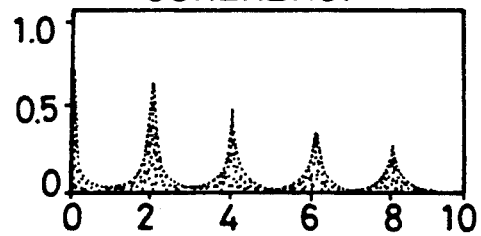
Figure 15:
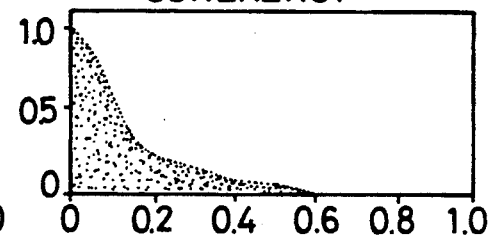

Referring to FIGS. 10 (a) to (c) to FIGS. 13 (a) to 13(c), the coherency function was obtained by assuming that the envelop over the oscillation spectrum can be represented by a Gaussian function (H/h=const) and by changing the number of modes with an intensity ratio of 0.05 or higher within the envelop from 40 to 50. Referring to FIGS. 14 (a) to (c) to FIGS. 17 (a) to 13(c), the coherency function was obtained by assuming that the envelop over the oscillation spectrum can be represented by a Lorentz function (H/h=const) and by changing the width h of the envelop at an intensity ratio of 0.05 or higher from 12 to 1.5 nm. In can be understood that in either case the coherency abruptly decreases if the spread of the envelop increases. The width h and the coherence length are generally inversely proportional to each other. In a region where the optical path difference is close to zero, the coherency does not depend upon the types of the functions representing the envelop. In consequence, the width h obtained for setting the coherence length to 100 $\mu$m or more is equal to or smaller than 6 nm, as represented by equation (2).

Figure 18:
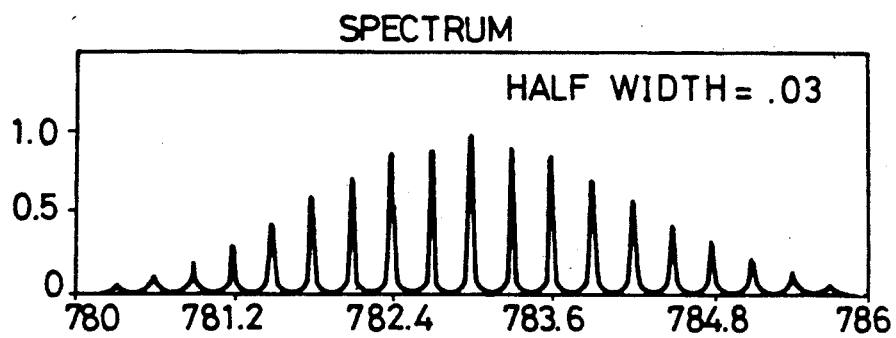
Figure 18:
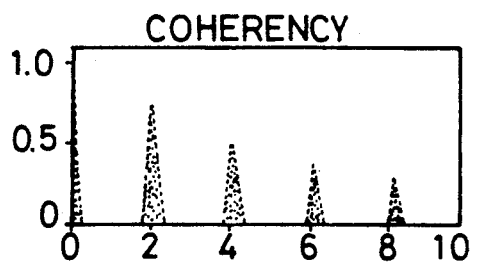
Figure 18:
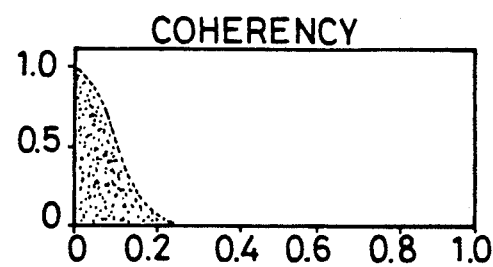
Figure 19:
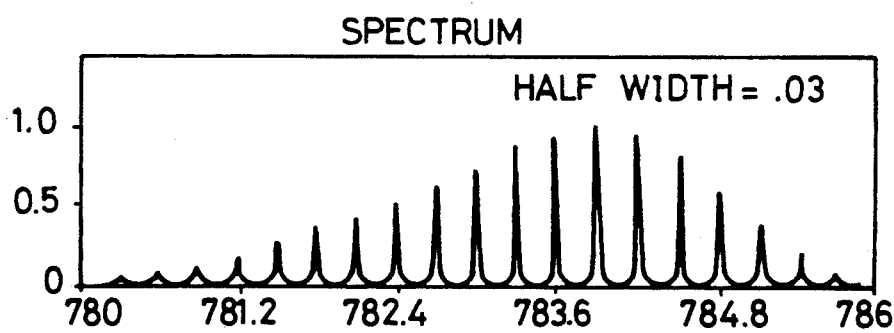
Figure 19:
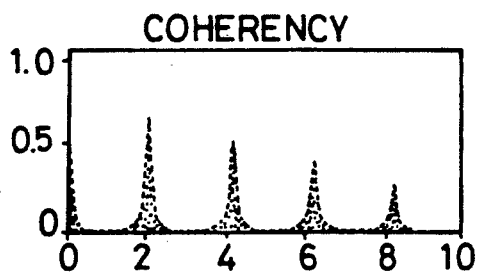
Figure 19:
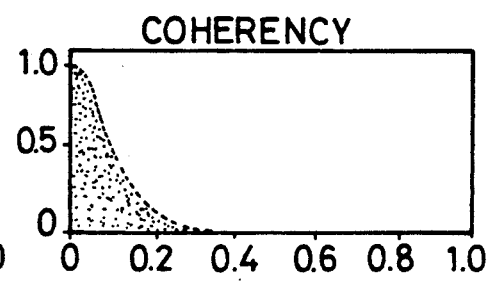
Figure 20:
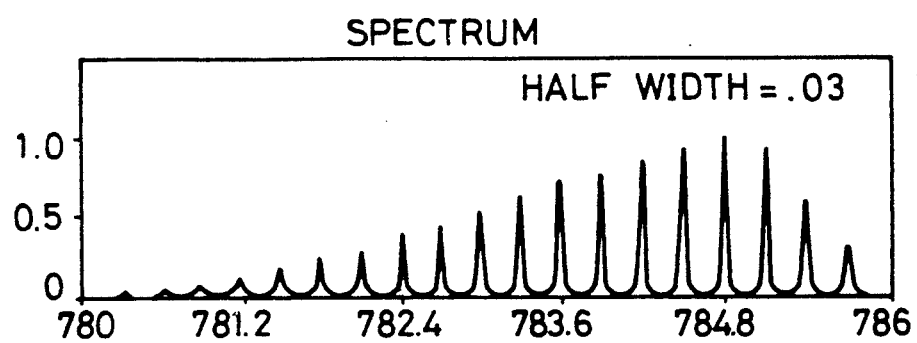
Figure 20:
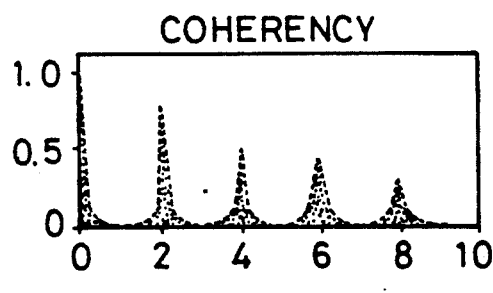
Figure 20:
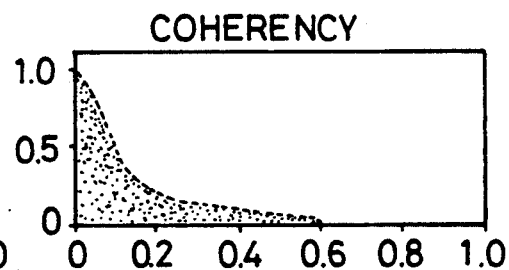

Referring to FIGS. 18 (a) to (c) to FIGS. 20 (a) to 20(c), the coherency function was obtained by shifting the reference wavelength $\lambda_0$ while constantly maintaining the width h of the envelop over the spectrum at an intensity ratio of 0.05 or higher so as to change the shape of the envelop. It can be clearly understood that the shape of the envelop of the spectrum does not substantially influence the coherency for an optical path length of a range of 0 to 0.1.

To obtain the semiconductor laser satisfying the conditions defined by equations (1) to (3), it is necessary to select the type of semiconductor laser, the driving current, the reference environmental temperature, and so on, as desired. The above-described effects can be achieved by employing a semiconductor laser satisfying those conditions as the light source of the interferometer.

In the encoder shown in FIG. 1B, the optical system is constructed in such a manner that the optical path lengths of a pair of diffracted light beams generated at the positions $M_1$ and $M_2$ and made to interfere with each other are substantially equal to each other. The driving current (signal) of the driving current source 20 for driving the semiconductor laser 1 can be changed, and a predetermined current (signal) is applied to the semiconductor laser 1 so that the oscillation spectrum of the semiconductor laser 1 satisfies the above-described conditions defined by equations 1 to 3. The present invention is therefore effective in that even if an optical path difference is produced by thermal expansion of the frame of the interferometer, the resulting reduction in the signal amplitude is very small and the occurrence of a discontinuity of the signal phase can be avoided.

The embodiment illustrated in FIGS. 1A and 1B relates a rotary encoder, but the present invention can also be applied to linear encoders. Also, the present invention can be applied to various types of optical measurement apparatus using lasers other than encoders.

What is claimed is:

1. An apparatus for measuring the displacement of a diffraction grating, comprising:
    a multi-mode semiconductor laser generating a laser beam having at least five vertical modes each having an intensity ratio of at least 0.05 and having an envelop which envelopes peaks of the respective vertical modes each having an intensity ratio of at least 0.05 in oscillation spectrum multi-mode, said envelope having a width of no greater than 6 nm;
    interference means for directing the laser beam from said laser to the diffraction grating and causing first and second diffracted light beams generated at the diffraction grating to interfere with each other to generate interference light, with the phase of the interference light changing according to the displacement of the diffraction grating; and
    conversion means for converting the interference light supplied by said interference means into an electrical signal to measure the displacement of the diffraction grating.

2. An apparatus according to claim 1, wherein said laser is constructed to generate the laser beam such that the half width of each of the at least five vertical modes is at least 0.03 nm.

3. An apparatus according to claim 1, wherein said laser is constructed to generate the laser beam having a coherence length of at least 100 $\mu$m.

4. An apparatus according to claim 1, wherein said interference means is arranged to cause the optical paths of the first and second diffracted light beams to be substantially equal to each other.

5. An apparatus for measuring the displacement of a diffraction grating, comprising:
    a multi-mode semiconductor laser for generating a laser beam;
    supply means for supplying a predetermined current to said laser so that at least five vertical modes occur in an oscillation spectrum of the laser beam generated by said laser at an intensity ratio of at least 0.05 and having an envelop which envelopes peaks of the respective vertical modes each having an intensity ratio of at least 0.05 in oscillation spectrum, said envelope having a width of no greater than 6 nm;
    interference means for splitting the laser beam generated by said laser into first and second beams, for directing the first and second beams to the diffraction grating, and for effecting interference between a first diffracted light beam generated by diffraction of the first beam at the diffraction grating and a second diffracted light beam generated by diffraction of the second beam at the diffraction grating to produce interference light, with the phase of the interference light changing according to the displacement of the diffraction grating; and
    conversion means for converting the interference light produced by said interference means into an electrical signal to measure the displacement of the diffraction grating.

6. An apparatus according to claim 5, wherein said laser is constructed to generate the laser beam such that half width of each of the at least five vertical modes is at least 0.03 nm.

7. An apparatus according to claim 5, wherein said laser is constructed to generate the laser beam having a coherence length of at least 100 $\mu$m.

8. An apparatus according to claim 5, wherein said interference means is arranged to cause the optical paths of the first and second diffracted light beams to be substantially equal to each other.

9. A method of measuring the displacement of a diffraction grating, comprising the steps of:
    directing to the diffraction grating laser radiation with a laser operated to produce a predetermined spectrum having at least five vertical modes each having an intensity ratio of at least 0.05 and having an envelop which envelopes peaks of the respective vertical modes each having an intensity ratio of at least 0.05 in oscillation spectrum and a width of no greater than 6 nm;

forming interference light by diffraction beams generated at the diffraction grating, with the phase of the interference light changing according to the displacement of the diffraction grating; and converting the interference beam into an electrical signal to measure the displacement of the diffraction grating.

10. A method according to claim 9, wherein said forming step includes a step of superposing ±1-order diffraction beams generated by the diffraction grating to form the interference beam, the optical path lengths of the ±1-order diffraction beams being substantially equal.

11. A method according to claim 10, wherein the half width of each of the at least five vertical modes is at least 0.03 nm.

12. A method according to claim 10, wherein said directing step includes the steps of:
providing a multi-mode semiconductor laser; and
supplying a predetermined current to said laser so as to emit the laser radiation from said laser.

13. A rotary encoder having a diffraction grating scale, comprising:
a multi-mode semiconductor laser generating a laser beam having at least five vertical modes each having an intensity ratio of at least 0.05 and having an envelop which envelopes peaks of the respective vertical modes each having an intensity ratio of at least 0.05 in oscillation spectrum said envelope having a width of no greater than 6 nm;
a rotary scale having a diffraction grating formed along a rotation direction;
interference means for splitting the laser beam generated by said laser into first and second beams, for directing the first and second beams to first and second positions on said diffraction grating, and for effecting interference between a first diffracted light beam from said first position and a second diffracted light beam from said second position to produce interference light, with the phase of the interference light changing according to the displacement of the diffraction grating; and
conversion means for converting the interference light produced by said interference means into an electrical signal and measuring a rotational state of said rotary scale to measure the displacement of the diffraction grating.

14. A rotary encoder according to claim 13, wherein said first and second positions are symmetric with respect to the axis of rotation of said rotary scale.

15. An apparatus for measuring displacement information, comprising:
a multi-mode semiconductor laser generating a laser beam having at least five vertical modes each having an intensity ratio of at least 0.05 and having an envelop which envelopes peaks of the respective vertical modes each having an intensity ratio of at least 0.05 in oscillation spectrum said envelope having a width of no greater than 6 nm;
interference means for directing the laser beam from said laser to an object and generating first and second light beams at the object to interfere with each other to generate interference light, with the phase of the interference light changing according to displacement between the object and said interference means; and
conversion means for converting the interference light supplied by said interference means into an electrical signal to measure the displacement information between the object and said interference means.

16. An apparatus according to claim 15, wherein said interference means is arranged to cause the optical paths of the first and second light beams to be substantially equal to each other.

17. An apparatus according to claim 15, wherein said laser is constructed to generate the laser beam such that the half width of each of the at least five vertical modes is at least 0.03 nm.

* * * * *

UNITED STATES PATENT AND TRADEMARK OFFICE
CERTIFICATE OF CORRECTION

PATENT NO. : 5,198,873
DATED : March 30, 1993
INVENTOR(S) : Ishizuka, et al.

It is certified that error appears in the above-indentified patent and that said Letters Patent is hereby corrected as shown below:

COLUMN 2:

Line 55, "envelop" should read --envelope--.
Line 57, "envelops" should read --envelope--.

COLUMN 3:

Line 26, "envelop," should read --envelope,--.
Line 48, "envelop," should read --envelope,--.
Line 68, "envelop" should read --envelope--.

COLUMN 4:

Line 2, "envelop" should read --envelope--.
Line 21, "envelop" should read --envelope--.
Line 25, "envelop" should read --envelope--.

COLUMN 5:

Line 13, "velop" should read --velope--.

COLUMN 7:

Line 1, "(c)" should read --10(c)--.
Line 3, "envelop" should read --envelope--.
Line 6, "envelop" should read --envelope--.

UNITED STATES PATENT AND TRADEMARK OFFICE
CERTIFICATE OF CORRECTION

PATENT NO. : 5,198,873
DATED : March 30, 1993
INVENTOR(S) : Ishizuka, et al.

It is certified that error appears in the above-indentified patent and that said Letters Patent is hereby corrected as shown below:

```
Line 7, "(c)" should read --14(c)-- and "13(c)" should
   read --17(c),--.
Line 9, "envelop" should read --envelope--.
Line 11, "envelop" should read --envelope--.
Line 12, "In" should read --It--.
Line 14, "envelop" should read --envelope--.
Line 19, "envelop." should read --envelope.--.
Line 22, "(c)" should read --18(c)--.
Line 25, "envelop" should read --envelope--.
Line 27, "envelop." should read --envelope.--.
Line 28, "envelop" should read --envelope--.
```

COLUMN 7:

```
Line 67, "envelop" should read --envelope--.
```

COLUMN 8:

```
Line 33, "envelop" should read --envelope--.
```

COLUMN 9:

```
Line 2, "envelop" should read --envelope--.
Line 4, "and" should read --, said envelope having--.
Line 32, "envelop" should read --envelope--.
Line 34, "spectrum" should read --spectrum,--.
```

UNITED STATES PATENT AND TRADEMARK OFFICE
CERTIFICATE OF CORRECTION

PATENT NO. : 5,198,873     Page 3 of 3
DATED : March 30, 1993
INVENTOR(S) : Ishizuka, et al.

It is certified that error appears in the above-indentified patent and that said Letters Patent is hereby corrected as shown below:

COLUMN 10:

Line 18, "envelop" should read --envelope--.
Line 20, "spectrum" should read --spectrum,--.

Signed and Sealed this

Nineteenth Day of April, 1994

Attest:

BRUCE LEHMAN

Attesting Officer       Commissioner of Patents and Trademarks